United States Patent
Li et al.

(10) Patent No.: US 11,100,369 B2
(45) Date of Patent: Aug. 24, 2021

(54) TRAINING METHOD FOR TAG IDENTIFICATION NETWORK, TAG IDENTIFICATION APPARATUS/METHOD AND DEVICE

(71) Applicant: BOE TECHNOLOGY GROUP CO., LTD., Beijing (CN)

(72) Inventors: Yue Li, Beijing (CN); Tingting Wang, Beijing (CN); Guangwei Huang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 129 days.

(21) Appl. No.: 16/509,774

(22) Filed: Jul. 12, 2019

(65) Prior Publication Data
US 2020/0151506 A1 May 14, 2020

(30) Foreign Application Priority Data
Nov. 14, 2018 (CN) .......................... 201811353105.X

(51) Int. Cl.
G06K 9/00 (2006.01)
G06K 9/62 (2006.01)
G06K 9/46 (2006.01)
G06N 3/08 (2006.01)

(52) U.S. Cl.
CPC ......... *G06K 9/6256* (2013.01); *G06K 9/4633* (2013.01); *G06K 9/4671* (2013.01); *G06N 3/08* (2013.01)

(58) Field of Classification Search
CPC .................................................. G06K 9/4633
See application file for complete search history.

(56) References Cited

U.S. PATENT DOCUMENTS

| | | | |
|---|---|---|---|
| 2016/0364625 A1* | 12/2016 | Lin | G06T 7/90 |
| 2017/0364733 A1* | 12/2017 | Estrada | G06K 9/6267 |
| 2018/0060719 A1* | 3/2018 | Kisilev | G06N 3/0454 |
| 2018/0150947 A1* | 5/2018 | Lu | G06T 5/20 |

(Continued)

OTHER PUBLICATIONS

Fu et al., "Dual Attention Network for Scene Segmentation", Cornell University, arXiv:1809.02983v4, Apr. 21, 2019, 10 pages.

(Continued)

*Primary Examiner* — Hadi Akhavannik
(74) *Attorney, Agent, or Firm* — Collard & Roe, P.C.

(57) ABSTRACT

The present disclosure provides a training method for a tag identification network, a tag identification apparatus/method and device. The training method for a tag identification network includes: acquiring a first number of first images, each of the first images having its standard tag; adjusting parameters of the tag identification network by utilizing the first number of first images and their standard tags; selecting a second number of first images from the first number of first images as images to be converted, the second number being smaller than the first number; performing a style conversion process on each of images to be converted to generate a second image corresponding thereto, and serving a standard tag of the image to be converted as a standard tag of the second image; and adjusting the parameters of the tag identification network by utilizing the second number of the second images and their standard tags.

17 Claims, 8 Drawing Sheets

(56) References Cited

U.S. PATENT DOCUMENTS

2018/0300850 A1* 10/2018 Johnson ................. G06T 11/00
2018/0322662 A1* 11/2018 Hellier ................. G06T 11/001

OTHER PUBLICATIONS

Zhu et al., "Learning Spatial Regularization with Image-level Supervisions for Multi-label Image Classification", Cornell University, arXiv:1702.05891v2, Mar. 31, 2017, 10 pages.
Zhu et al., "Unpaired Image-to-Image Translation using Cycle-Consistent Adversarial Networks", Cornell University, arXiv:1703.10593v6, Nov. 15, 2018, 18 pages.

* cited by examiner

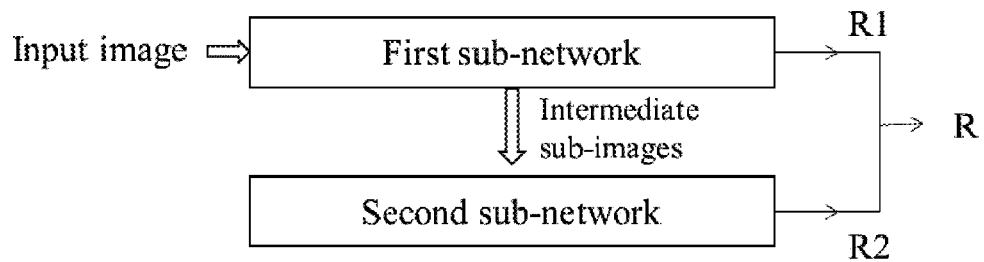

Fig.3

As for a part of first images of the first number of the first images, inputting each of the first images to the first sub-network as the input image, adjusting parameters of the first sub-network according to a standard tag of the input image and a first sub-identification tag output by the first sub-network — S201

Fixing the parameters of the first sub-network, utilizing each of at least a part of first images in the first number of first images as the input image to be input to the first sub-network, and adjusting parameters of the second sub-network according to the standard tag of the input image and the second sub-identification tag output by the second sub-network — S202

Fig.4

TRAINING METHOD FOR TAG IDENTIFICATION NETWORK, TAG IDENTIFICATION APPARATUS/METHOD AND DEVICE

CROSS REFERENCE TO RELATED APPLICATIONS

Applicant claims priority under 35 U.S.C. § 119 of Chinese Application No. 201811353105.X filed on Nov. 14, 2018, the disclosure of which is incorporated by reference.

TECHNICAL FIELD

The present disclosure relates to a field of tag identification, in particular to a training method for a tag identification network, a tag identification apparatus/method and device.

BACKGROUND

Identification of an image tag by utilizing neutral networks is a rising technique with the development of advanced learning technique. The tag can be represented as features of image content, image scene, and image style and so on.

SUMMARY

According to one aspect of the present disclosure, there is provided a training method for a tag identification network, comprising: acquiring a first number of first images, each of the first images having its standard tag; adjusting parameters of the tag identification network by utilizing the first number of first images and their standard tags; selecting a second number of first images from the first number of first images as images to be converted, the second number being smaller than the first number; performing a style conversion process on each of images to be converted to generate a second image corresponding thereto, and serving a standard tag of the image to be converted as a standard tag of the second image; and adjusting the parameters of the tag identification network by utilizing the second number of the second images and their standard tags.

According to the embodiments of the present disclosure, the method further comprises acquiring a third number of third images, each of the third images having its standard tag; adjusting the parameters of the tag identification network by utilizing the third number of third images and their standard tags, wherein a style of the third images is the same as a style of the second images.

According to the embodiments of the present disclosure, the first image is a photographic image, the second image is a painting work generated by performing a style conversion process on the first image, and the third image is a real painting work.

According to the embodiments of the present disclosure, the tag identification network comprises a first sub-network and a second sub-network; the first sub-network receives an input image, outputs an intermediate sub-image to the second sub-network, and generates a first sub-identification tag of the input image, and the second sub-network receives the intermediate sub-image from the first sub-network, and generates a second sub-identification tag.

According to the embodiments of the present disclosure, adjusting parameters of the tag identification network by utilizing the first number of first images and their standard tag comprises: as for a part of first images in the first number of first images, inputting each of the first images to the first sub-network as the input image, adjusting parameters of the first sub-network according to a standard tag of the input image and a first sub-identification tag output by the first sub-network; and fixing the parameters of the first sub-network, utilizing each of at least a part of first images in the first number of first images as the input image to be input to the first sub-network, and adjusting parameters of the second sub-network according to the standard tag of the input image and the second sub-identification tag output by the second sub-network.

According to the embodiments of the present disclosure, the first sub-network has a plurality of convolution layers, and adjusting parameters of the second sub-network comprises: as for each of the first images, serving an output result of an i-th convolution layer in the first sub-network as a first intermediate sub-image to be input to the second sub-network; serving an output result of a j-th convolution layer in the first sub-network as a second intermediate sub-image to be input to the second sub-network, the second intermediate sub-image and the first intermediate sub-image having different sizes; adjusting the parameters of the second sub-network according to the standard tag of the first image and the second sub-identification tag output by the second sub-network, where i is smaller than j, and i and j are positive integers.

According to the embodiments of the present disclosure, the standard tag comprises a content tag or a scene tag.

According to another aspect of the present disclosure, there is provided a tag identification apparatus, comprising: a first sub-network module, configured to receive an input image, process the input image to generate intermediate sub-images, and generate a first sub-identification tag of the input image; a second sub-network module, configured to receive the intermediate sub-images from the first sub-network module, and process the intermediate sub-image to generate a second sub-identification tag; and a combination module, configured to combine the first sub-identification tag and the second sub-identification tag, and generate an identification tag.

According to the embodiments of the present disclosure, the first sub-network module has a plurality of convolution layers, and an output result of an i-th convolution layer is served as a first intermediate sub-image to be input to the second sub-network module, an output result of a j-th convolution layer is served as a second intermediate sub-image to be input to the second sub-network module, and the second intermediate sub-image and the first intermediate sub-image have different sizes; where i is smaller than j, and i and j are positive integers.

According to the embodiments of the present disclosure, the tag identification apparatus further comprises a training module, configured to: acquire a first number of first images, each of the first images having its standard tag; adjust parameters of the tag identification network by utilizing the first number of first images and their standard tag; select a second number of first images from the first number of first images as images to be converted, the second number being smaller than the first number; perform a style conversion process on each of images to be converted to generate a second image corresponding thereto, and serve a standard tag of the image to be converted as a standard tag of the second image; and adjust parameters of the tag identification network by utilizing the second number of the second images and their standard tags.

According to the embodiments of the present disclosure, the training module is further configured to acquire a third number of third images, each of the third images having its standard tag; adjust the parameters of the tag identification network by utilizing the third number of third images and their standard tags, wherein a style of the third images is the same as a style of the second images.

According to the embodiments of the present disclosure, adjusting, by the training module, parameters of the tag identification network by utilizing the first number of first images and their standard tag comprises: as for a part of first images in the first number of first images, inputting each of the first images to the first sub-network module as a first training image, and adjusting parameters of the first sub-network module according to a standard tag of the first training image and a first sub-identification tag output by the first sub-network module; and fixing the parameters of the first sub-network module, utilizing each of at least a part of first images in the first number of first images as a second training image to be input to the first sub-network module, and adjusting parameters of the second sub-network module according to a standard tag of the second training image and the second sub-identification tag output by the second sub-network module.

According to the embodiments of the present disclosure, adjusting, by the training module, the parameters of the second sub-network module comprises: receiving a first intermediate sub-image and a second intermediate sub-image output by the first sub-network module, and processing the intermediate sub-image to generate a second sub-identification tag; adjusting the parameters of the second sub-network module according to the standard tag of the input image and the second sub-identification tag output by the second sub-network module.

According to the embodiments of the present disclosure, the first image is a photographic image, the second image is a painting work generated by performing a style conversion process on the first image, and the third image is a real painting work.

According to the embodiments of the present disclosure, the standard tag comprises a content tag or a scene tag.

According to another aspect of the present disclosure, there is provided a tag identification method, comprising: acquiring an input image; receiving the input image by utilizing a first sub-network of a tag identification network and processing the input image, to output an intermediate sub-image and generate a first sub-identification tag; receiving the intermediate sub-image from the first sub-network by utilizing a second sub-network of the tag identification network, and performing image processing on the intermediate sub-image to generate a second sub-identification tag; and combining the first sub-identification tag and the second sub-identification tag to generate an identification tag.

According to the embodiments of the present disclosure, the first network has a plurality of convolution layers, an output result of an i-th convolution layer is served as a first intermediate sub-image, an output result of a j-th convolution layer is served as a second intermediate sub-image, and the first intermediate sub-image and the second intermediate sub-image have different sizes, where i is smaller than j, and i and j are positive integers; an identification tag is generated based on the first sub-identification tag and the second sub-identification tag by utilizing the tag identification network.

According to another aspect of the present disclosure, there is provided an image processing device, comprising: a processor; and a storage, wherein the storage is stored with a computer readable code which performs the training method for a tag identification network according to claim 1 when being executed by the processor.

BRIEF DESCRIPTION OF THE DRAWINGS

In order to describe technical solutions in embodiments of the present disclosure or in the prior art more clearly, accompanying figures needed to be used in description of the embodiments or the prior art will be introduced below briefly. Obviously, the accompanying figures described below are just some embodiments of the present disclosure. For those ordinary skilled in the art, other figures can also be obtained from these figures without paying any inventive labor.

FIG. 3 shows a structure schematic diagram of a tag identification network according to some embodiments of the present disclosure;

FIG. 4 shows a flow diagram of adjusting parameters of a tag identification network according to some embodiments of the present disclosure;

DETAILED DESCRIPTION

Figure 1:
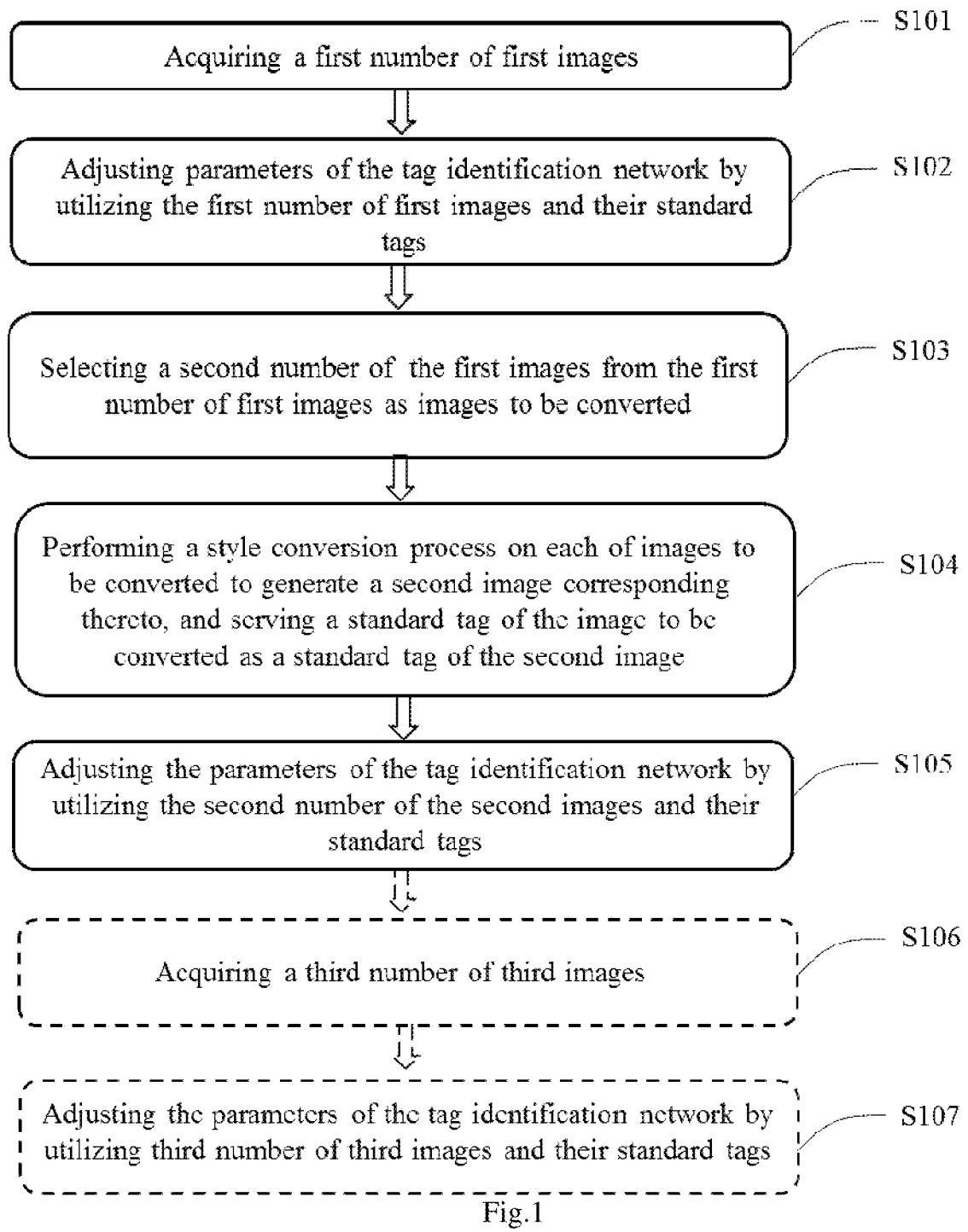
FIG. 1 shows a flow diagram of a training method for a tag identification network according to some embodiments of the present disclosure.

Technical solutions in embodiments of the present disclosure will be described clearly and completely by combining with accompanying figures in the embodiments of the present disclosure. Obviously, the embodiments described below are just a part of embodiments of the present disclosure, but not all the embodiments. Based on the embodiments in the present disclosure, all the other embodiments obtained by those ordinary skilled in the art without paying any inventive labor belong to the scope sought for protection in the present disclosure.

"First", "second" and similar words used in the present disclosure do not indicate any sequence, quantity or importance, but are just used to distinguish different components. Also, "include", "comprise" and other similar words mean that an element or an object appearing prior to the word contains an element or an object or its equivalent listed subsequent to the word, but does not exclude other elements or objects. "Connect", "connected to" and other similar words are not limited to physical or mechanical connection, but can comprise electrical connection, regardless of direct connection or indirect connection.

Flow diagrams used in the present disclosure are used to describe steps of methods according to the embodiments of the present disclosure. It shall be understood that previous or subsequent steps are not necessarily performed accurately in sequence. On the contrary, various steps can be processed in an inverted order or processed simultaneously. At the same time, other operations can also be added to these processes or one step or several steps can be removed from these processes.

Artificial neural network is an algorithm mathematical model that imitates behavioral features of animal neural networks and performs distributed and parallel information processing. Such networks depend on complexity of a system, achieve the purpose of processing information by adjusting mutual connection relationship between masses of nodes within the system, and have capabilities of self-learning and self-adaptation. The advanced learning technology based on neutral networks has a very large potential in aspects of data understanding, image feature identification, etc. For example, performing tag identification by utilizing the neutral networks can realize functions of image classification effectively and rapidly.

After the structure of the neutral networks is constructed, it needs to set initial parameters for the neutral networks, and complete a process of training the neutral networks through a pre-constructed database of training images, so that it is capable of outputting an expected result, for example, identifying content tags in the image. The training process can be understood as a process of constantly adjusting the parameters of the neutral networks, and constantly optimizing the parameters of the neutral networks based on plenty of training images having real tags, by utilizing a loss function, that is, enabling the output result of the neutral networks to get closing to the real tags. In other words, the trained neutral networks have learned the capability of outputting an expected result.

Thus, in a task of identifying content features of a painting work of a certain style (for example, an oil painting) by utilizing the neutral networks, it needs to pre-construct an image database including a large number of painting work features of this style, and needs to label the real tag for each image in advance. However, in the process of constructing the image database, for example, if it is expected to identify content features in painting works having features of oil paintings, then it needs to collect a large number of images of real oil painting works. However, it is often difficult to obtain a sufficient number of images of real oil painting works as training images. Furthermore, for the obtained oil painting works, it needs to artificially label their real tags. For example, if a content feature of a piece of oil painting work is dog, then a tag corresponding to this piece of oil painting work needs to be labeled as dog. Thus, the training process of the neutral networks is still confronted with huge tasks in labeling real tags. In addition, in an application scenario where it is expected the neutral networks realize identification of diversified content features with respect to painting works of a great variety of painting styles, the amount of data of the training images as required and the quantity of tasks in labeling the real tags will increase.

In a related image tag identification method, it needs to input an image to be identified to a neutral network. The neutral network processes the image, so as to generate a tag (or tags) of the image to be identified. In order to acquire a tag output result having a relatively high accuracy, it needs to collect a large number of training images labeled with the real tags in advance, which are used to complete the training process of the neutral network. The training process may comprise inputting the training image to a neutral network to be trained and outputting an output result corresponding to the training image. Parameters of the neutral network are adjusted based on the output result and the real tags corresponding to the training images, by utilizing the neutral network loss function, and through constant training processes, the result output by the neutral networks would be getting close to the real tags. It needs a large number of sample images used for training and spend a lot of time on labeling the real tags for the sample images.

The present disclosure provides a training method for a tag identification network, a tag identification apparatus/method and device. The training method for the tag identification network can realize the training process of the tag identification network by combining with the image style conversion process, based on easily obtained common photographic images. The tag identification network can be a tag identification apparatus having neutral network architecture.

Figure 2A:
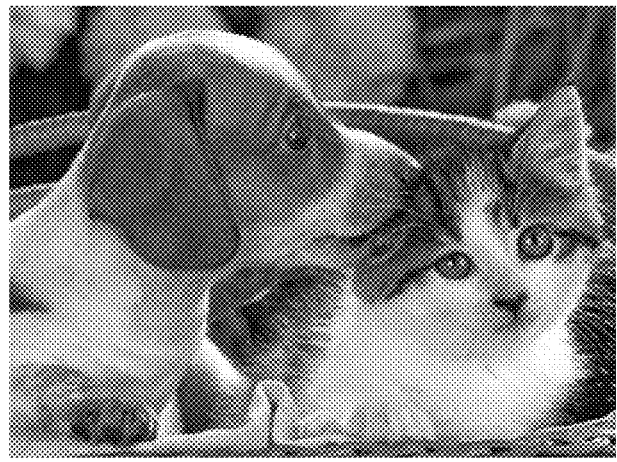
FIG. 2A shows a schematic diagram of a first image according to some embodiments of the present disclosure.

FIG. 1 shows a flow diagram of a training method for a tag identification network according to some embodiments of the present disclosure. First, in step S101, a first number of first images are acquired, wherein each first image has its standard tag or referred as a real tag. The first image may be an easily obtained photographic image, for example, an image as shown in FIG. 2A. A training image database for training the tag identification network is constructed by collecting the first number of first images.

The tag identification network may have a neutral network structure, and can be expected to realize identification of the content features of painting works of diversified styles, and output content feature tags. Since the first image is a photographic image, compared with an image of a painting work, it is easier to obtain large amounts of image data of the first image, for example, based on the existing image database. For example, the first number may be ten thousand pieces. The content feature tag output by the tag identification network may be a tag including one value or a tag vector including multiple values, i.e., realizing multi-tag identification of one piece of input image by utilizing the tag identification network.

For example, if it is expected that the tag identification network implements identification of ten content features, which may be cat, dog, human, window, sky, sun, mountain, river, house, chair respectively, then after one piece of image is input to the tag identification network, it is desired that the network output one tag vector, for example, R=(1110000000). This tag vector indicates that the tag identification network determines the input image includes the content features of cat, dog and human but does not include the content features of window, sky, sun, mountain, river, house, and chair after performing image processing on the input image. It can be understood that the tag about the content features are just for illustration, and the tag identification network according to the present disclosure, it can be further used to identify other content features, or can also be used to identify scene features, image style features (for example, oil painting, ink painting, etc.). No further details are given herein.

Next, in step S102, parameters of the tag identification network are adjusted by utilizing the first number of first images and their standard tags. The adjusting the parameters of the tag identification network can be a process of utilizing the first images to train the tag identification network to identify the content features. For example, each image of the first number of first images can be input to the tag identification network one by one, the tag identification network can generate a tag vector R with respect to the input image. The parameters of the tag identification network are constantly adjusted by comparing the tag vector R output by the tag identification network and the real tag vector Y1 of the first image, so that the generated tag vector R is getting close to a real tag vector Y1.

According to the embodiments of the present disclosure, the parameters may comprise convolution kernels and biases of the convolution neutral network in the tag identification network. The convolution kernel and bias can decide an enabling status of the image features used for generating a tag identification result. For example, a contribution weight value of each element in the feature images extracted from the input image made for generation of the identification tag may be determined by the convolution kernel and the bias. The parameters of the tag identification network are adjusted so that an output identification tag is getting close to the real tag.

According to the embodiments of the present disclosure, the process of adjusting the parameters of the tag identification network by utilizing the first number of first images and their standard tags can be implemented by means of constructing a loss function and calculating a loss value. For example, one piece of first image is represented as I1, and after it is input to the tag identification network, the tag identification network processes the first image, and generates an identification tag R, a loss value of the current network is calculated according to the loss function based on the tag R and the real tag Y1 of the first image, and the parameters of the tag identification network are adjusted based on a calculated loss value. After that, another piece of first image is represented as I2 and input to the tag identification network, and again the loss value is calculated according to the above process and the parameters of the tag identification network are adjusted, so that the loss value of the tag identification network decreases gradually, and the identification tag R generated by the tag identification network is getting close to the real tag Y1 gradually, i.e., training the tag identification network to perform image processing and output an expected result.

Thus it needs to label real content features of the first images used for training. In other words, it needs to label standard tags of the first images. For example, labeling process can be made by means of the existing labeling tools or made artificially. It needs to note that the method of labeling does not form a limitation to the present disclosure. For example, as for the first images as shown in FIG. 2A, their standard tags can be labeled as T1=(1100000000), i.e., indicating that the image includes features of cat and dog but does not include features of human, window, sky, sun, mountain, river, house, and chair.

In particular, in step S102, primary training of the tag identification network can be implemented based on the first number of first images having real tags, of which the tag identification network can be expected to implement identification of the content features of the painting works. In the process of primary training, since the first images are photographic images, it is easier to obtain a sufficient number of image data compared with the painting works. In addition, most of painting works are abstract representations of real scenes. Comparatively speaking, as for the photographic images that really reflect image features, it is easier to label their content feature tags. In other words, the process of performing primary training on the tag identification network by utilizing the photographic images in step S102 reduces the difficulty in acquiring lots of painting works with real tags as training images. For example, the tag identification network after going through the primary training in step S102 can be represented as a model 1.

Next, in step S103, a second number of the first images are selected from the first number of first images as images to be converted, of which the second number can be smaller than the first number. In step S104, for each of the images to be converted, a style conversion process is performed to generate a second image corresponding thereto, and standard tags of the images to be converted are served as standard tags of the second images.

Since the tag identification network is intended for use in identification of the content features of the painting works, on the basis of training in step S102, it needs to perform further training by utilizing images having the features of painting works.

In the embodiments according to the present disclosure, the training process is combined with the image style conversion process. Through the image style conversion process, a part of images of the first number of first images, for example, the second number of the first images are converted into the second images having the painting style. The image style conversion process can be implemented based on the existing style conversion process, for example, performing the above conversion process by utilizing another neutral network having the style conversion function, for example, converting the first images which are served as the photographic images into the second images having the style of oil painting. In addition, in a case where the tag identification network is intended for implementing identification of features with respect to images of a variety of painting styles, the images to be converted can be converted into different painting styles by utilizing a style conversion tool, and the tag identification network is then trained respectively.

In the present disclosure, for example, styles of the painting works can be classified in accordance with differences of materials, tools or techniques of presentation used for producing the painting works. For example, the style of the painting works may be a type of traditional Chinese painting, oil painting, print painting, watercolor painting, gouache painting, sketch, literary sketch, etc. It needs to note that the style of the painting works does not form a limitation to the present disclosure.

Additionally, since the second image is an image obtained by performing the image style conversion process on the first image, the standard tag Y2 of the obtained second image is the same as the standard tag Y1 of the first image that generates the second image.

Next, in step S105, the parameters of the tag identification network are adjusted by utilizing second number of the second images and their standard tags, and the process of adjusting the parameters of the tag identification network can be performed based on the model 1 which has gone through the primary training. As described above, the standard tag Y2 of the second image is the same as the standard tag Y1 of the first image that generates the second image.

Then, in this step, there is no need to label the standard tag of the second image. According to the embodiments of the present disclosure, the step S105 may be a process of further training the tag identification network on the basis of the primary training in step S102, i.e., further adjusting the parameters of the tag identification network, so that it learns identification of the content features of the second image which has gone through the image style conversion process. The process of adjusting is similar to the step S102, that is, inputting each image of second number of the second images to the tag identification network, outputting an identification tag R, and adjusting the parameters of the tag identification network by comparing the output identification tag R and the real tag Y2 of the input image, so that its output identification tag R is getting close to the real tag Y2, thus making that the tag identification network implements identification of the content features of the painting works. For example, the tag identification network which has gone through the training step in step S105 can be expressed as a model 2.

In the embodiments according to the present disclosure, the training of the tag identification network is realized by combining with the image style conversion process based on an easily acquired photographic image. Since the second image acquired by converting has a standard tag being the same as the first image that generates the second image, the task in labeling the real tag of the second images is reduced, thereby simplifying the training process of the tag identification network.

As shown in FIG. 1, in some embodiments according to the present disclosure, the training method for the tag identification network may further comprise steps S106 and S107.

Figure 2B:
FIG. 2B shows a schematic diagram of a third image according to some embodiments of the present disclosure.

In step S106, a third number of third images are acquired, and each of the third images has its standard tag. For example, real painting works having the same style as the second images can be acquired as the third images, and real tags are labeled on the third images by utilizing labeling tools, for the use of further training the tag identification network. FIG. 2B shows a schematic diagram of the third image according to the embodiments of the present disclosure. As for the third image as shown in FIG. 2B, its standard tag is Y3, which may be Y3=(0011000001), i.e., indicating that the third image includes features of human, window and chair but does not include cat, dog, sky, sun, mountain, river and house.

Next, in step S107, the parameters of the tag identification network are adjusted by utilizing the third number of third images and their standard tags. This process of adjusting the parameters can be performed on the basis of the model 2 obtained after the step of adjusting in S105, i.e., realizing further training the tag identification network, so that its output identification tag R is getting close to a real tag Y3. The process of adjusting is similar to steps S102 and S105, and thus no further details are given herein.

Since the tag identification network has gone through the training process as described in steps S102 and S105 prior to step S107, the number of third images as requires is far less than the first number or the second number. For example, in the case where the first number is ten thousand, the third number may be one hundred. Thus, in the process of training the tag identification network to identify tags of the painting works, the number of real painting works as required is reduced, and the process of obtaining a large number of painting works and labeling their real tags is simplified. For example, the tag identification network having gone through the training step in step S107 can be expressed as model 3, and taken as the final tag identification network for identifying the content features in the painting works.

In the embodiments of the present disclosure, the tag identification network may comprise a first sub-network and a second sub-network. FIG. 3 shows a schematic diagram of a structure of the tag identification network according to the embodiments of the present disclosure. Herein, an input image can be received by the first sub-network in the tag identification network, the first sub-network can comprise a plurality of convolution layers to realize processing features of the input image, outputting an intermediate sub-image to the second sub-network, and generating a first sub-identification tag R1 of the input image.

The second sub-network of the tag identification network receives the intermediate sub-images from the first sub-network, used to generate a second sub-identification tag R2. According to the embodiments of the present disclosure, the tag identification network can generate an identification tag R based on the first sub-identification tag R1 and the second sub-identification tag R2. For example, the finally output identification tag can be represented as R=0.5×(R1+R2), of which R, R1 and R2 may be tag vectors corresponding to a plurality of content features, or may be a tag value corresponding to one content feature. Other embodiments according to the present disclosure may adopt other methods to generate R based on R1 and R2. For example, R can be obtained by setting different weight values for R1 and R2. At this time, the identification tag R can be expressed as R=a×R1+b×R2, where a and b can be weight values of R1 and R2.

In addition, the tag identification network may further output the first sub-identification tag R1, the second sub-identification tag R2 and the identification tag R.

As shown in FIG. 4, in some embodiments according to the present disclosure, in step S102, adjusting the parameters of the tag identification network by utilizing the first number of first images and their standard tags may comprise steps S201 and S202.

In step S201, as for a part of first images of the first number of first images, each of the first images is served as an input image input to the first sub-network, and parameters of the first sub-network is adjusted according to a standard tag of the input image and the first sub-identification tag output by the first sub-network. That is, in step S201, the parameters of the first sub-network as shown in FIG. 3 can be firstly trained. In this process, the parameters of the first sub-network are adjusted based on only the first sub-identification tag R1 output by the first sub-network and the standard tag Y1 of the first image, while parameters of the second sub-network are fixed (i.e., being not adjusted).

Next, in step S202, the parameters of the first sub-network are fixed, and each of at least a part of first images in the first number of first images is served as the input image input to the first sub-network, and the parameters of the second sub-network are adjusted according to the standard tag of the input image and the second sub-identification tag R2 output by the second sub-network.

In the steps S201 and S202, the process of training the first sub-network and the second sub-network respectively can be selected to be performed depending on specific conditions of the tag identification network. For example, when the first sub-network has a better initial parameters, the number of the first images used for training the first sub-network can be reduced properly; when the second sub-network is a newly constructed neutral network and the initial network is immature, the number of the first images used for training the second sub-network is increased properly, so that the learning capabilities of the network of the above two parts are well-matched, which avoids the situation where learning capability of one sub-network is relatively strong while learning capability of another sub-network is relatively weak, which is likely to be caused by training two networks simultaneously.

Additionally, the first image used for training the first sub-network and the first image used for training the second sub-network may be the same or may be different, to which the present disclosure does not limit.

According to some embodiments of the present disclosure, in the process of training the tag identification network, parameters of the first sub-network and the second sub-network can be trained respectively in accordance with the specific conditions of initial parameters of the first sub-network and the second sub-network. Herein, training parameters of the first sub-network and the second sub-network respectively can for example comprise training the first sub-network firstly and fixing the parameters of the first sub-network, and then training the second sub-network. According to another embodiments of the present disclosure, the tag identification network can also be served directly as a whole to perform the process of adjusting the parameters, i.e., jointly adjusting the parameters of the first sub-network and the second sub-network according to the finally output identification tag R. According to other embodiments of the present disclosure, the process of training the sub-networks can be performed by combining the process of training the sub-networks respectively with the process of training the sub-networks as a whole.

The first sub-network according to the embodiments of the present disclosure can be composed of a plurality of convolution layers, and used to process the features of the input images, so as to generate a first identification sub-tag. It needs to understand that the structure of the first sub-network can set as other structures as required, for example, full connection layer, pooling layer, or normalization layer, etc.

Figure 5:
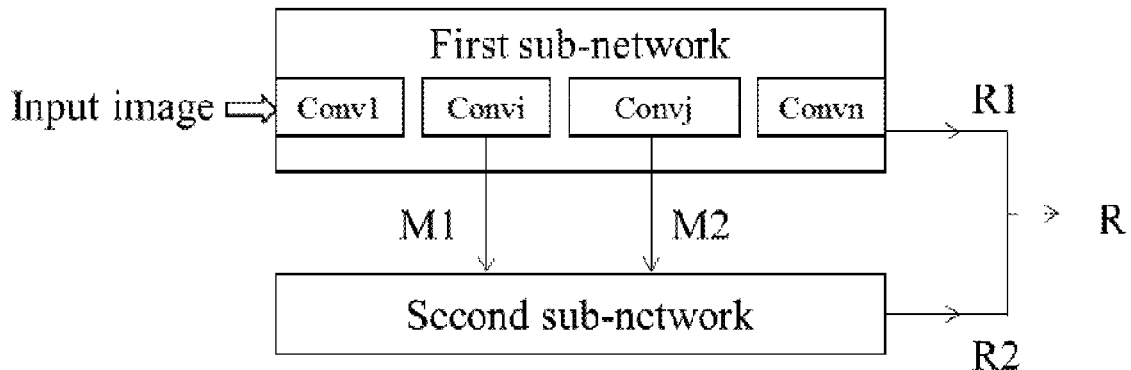
FIG. 5 shows a further schematic diagram of a tag identification network according to the present disclosure.

FIG. 5 shows a further schematic diagram of the tag identification network according to the present disclosure. As shown in FIG. 5, the first sub-network comprises n convolution layers, such as a convolution layer Convl, a convolution layer Convi, a convolution Convj, and a convolution layer Convn. As described above, the structure of the first sub-network as shown in FIG. 5 is just for illustration, and the first sub-network can further comprise other convolution layers or other processing structures.

In FIG. 5, an intermediate sub-image M1 output by the convolution layer Convi is not only input to the convolution layer convj subsequent thereto but also input to the second sub-network. Also, an intermediate sub-image M2 output by the convolution layer Convj is not only input to the convolution layer Convn subsequent thereto but also input to the second sub-network. The intermediate sub-images M1 and M2 can be served as a first intermediate sub-image and a second intermediate sub-image used for training the second sub-network. Herein, the convolution layer Convi and the convolution layer Convj may be adjacent convolution layers in the first sub-network, or may be non-adjacent convolution layers in the first sub-network, where i is smaller than j, and i and j are positive integers.

In the embodiments according to the present disclosure, after having received the intermediate sub-images M1 and M2, the second sub-network can extract their image features respectively and perform processes of integration of the image features, so as to generate the second sub-identification tag R2.

Figure 6:
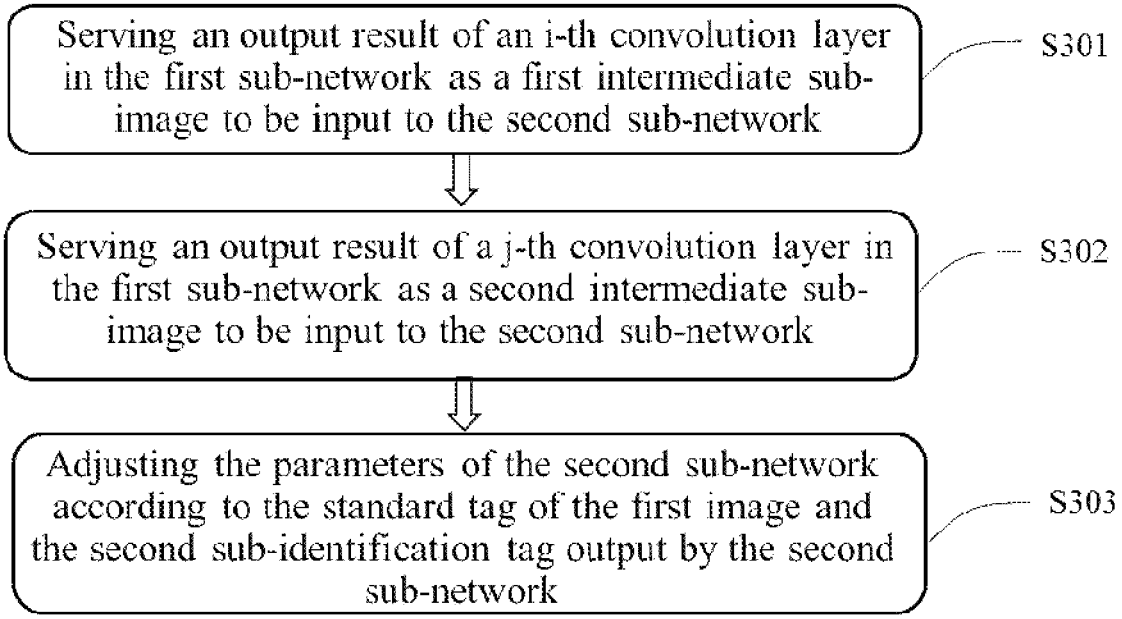
FIG. 6 shows a flow diagram of adjusting parameters of a second sub-network according to some embodiments of the present disclosure.

Adjusting the parameters of the second sub-network according to the present disclosure, for each first image, can further comprise following steps as shown in FIG. 6.

In step S301, an output result M1 of an i-th convolution layer Convi in the first sub-network is served as a first intermediate sub-image to be input to the second sub-network; in step S302, an output result of a j-th convolution layer Convj in the first sub-network is served as a second intermediate sub-image M2 to be input to the second sub-network. Since compared with the first intermediate sub-image M1, the second intermediate sub-image M2 has gone through processing of more convolution layers, for example, having gone through the processing of the convolution layer Convj, the size of the second intermediate sub-image M2 is different from that of the first intermediate sub-image M1. The size of the second intermediate sub-image M2 may be smaller than the size of the first intermediate sub-image M1.

Next, in step S303, the parameters of the second sub-network are adjusted according to the standard tag of the first image and the second sub-identification tag R output by the second sub-network. The second sub-network receives two sub-images M1 and M2 in the first sub-network which have been processed by a convolution layer of a different layer number, of which the sub-images M1 and M2 have the content features from different layers. Through processing such as integration of image features and so on, the second sub-network outputs the second sub-identification tag R2, and adjusts the parameters of the second sub-network according to the second sub-identification tag R2 and the real tag of the first image used for generating the sub-image, so that the output result of the second sub-network is getting closer to the real tag.

In the training method for the tag identification network according to the embodiments of the present disclosure, the training of the tag identification network is realized by combing with the image style conversion process based on the easily obtained photographic image, and the tag identification network can be a tag identification apparatus having neutral network architecture. Since the second image obtained by the image style conversion process has a standard tag being the same as the first image that generates the second image, steps of labeling real tag on the second image are reduced, so that the process of training the tag identification network is simplified. In addition, the process of initially training the tag identification network by utilizing the photographic image also reduces difficulty in acquiring a great number of images of painting works with real tags.

The tag identification apparatus according to some embodiments of the present disclosure will be described below in detail by combining with the accompanying figures. It needs to understand that the training method according to the present disclosure can be used to train the tag identification apparatus, and can also be used to implement training processes of other tag identification neutral network structures.

Figure 7:
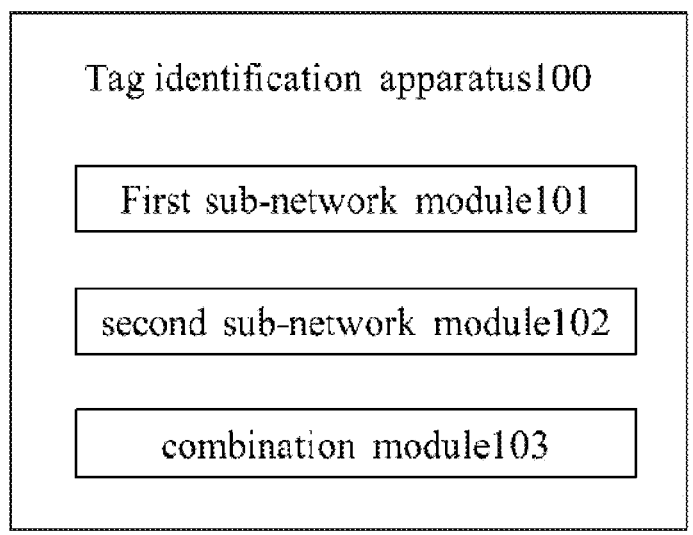
FIG. 7 shows a schematic diagram of a tag identification apparatus according to some embodiments of the present disclosure.

The present disclosure further provides a tag identification apparatus. FIG. 7 shows a schematic diagram of a tag identification apparatus 100. For example, the tag identification network 100 may comprise a first sub-network module 101, a second sub-network module 102 and a combination module 103. Herein, the first sub-network module 101 can be configured to receive an input image and process the input image to generate intermediate sub-images, and generate a first sub-identification tag of the input image. The second sub-network module 102 can be configured to receive the intermediate sub-images from the first sub-network module 101 and process the intermediate sub-image to generate a second sub-identification tag. The combination module 103 can be configured to combine the first sub-identification tag and the second sub-identification tag, to generate an identification tag.

According to the embodiments of the present disclosure, the first sub-network module 101 can be a convolution neutral network (for example, ResNet-101) configured to implement classification of the content features. Network depth of the convolution neutral network can be 101 layers. Furthermore, after being trained by lots of images in an image database (ImageNet), the convolution neutral network can divide the input image into for example 1000 tag categories, e.g., keyboard, cursor mouse, pencil and various animals and so on, that is, the identification tag output by the convolution neutral network is a tag vector including 1000 tag values. In the tag vector, if a tag value at one position in the tag vector is 1, then it indicates that convolution neutral network determines to obtain that the input image includes a feature corresponding to the position, for example, cat. If a tag value at another position in the tag vector is 0, then it indicates that the convolution neutral network determines that the input image does not include the feature corresponding to the position, for example, dog. The size of the input image of the convolution neutral network can be 224×224 pixels.

On such a basis, an expected feature identification performed on the input image can be implemented by utilizing the convolution neutral network trained by the image database (ImageNet). For example, the convolution neutral network itself can implement identification of 1000 features since it has been trained by the image database, i.e., having initial parameters that can realize feature identification. On such a basis, the expected feature identification can be implemented by utilizing the convolution neutral network, for example, implementing identification of 10 content features such as cat, dog, human, window, sky, sun, mountain, river, house, and chair. Herein, it only needs to continue training the network on the basis of the convolution neutral network based on the expected feature identification task to achieve the expected identification result, and output the identification tag R according to a number (for example, 10) of content features expected to achieved.

Since the first sub-network module 101 can be implemented through the existing convolution neutral network (RestNet-101), the specific structure of the first sub-network module 101 is not described herein. It needs to note that in other embodiments according to the present disclosure, the first sub-network module 101 may be further implemented as other neutral networks that can implement identification of image features, and the structure of the first sub-network module 101 does not form a limitation to the present disclosure.

According to the embodiments of the present disclosure, the first sub-network module 101 receives the input image, outputs the intermediate sub-image, and generates the first sub-identification tag R1 of the input image.

According to the embodiments of the present disclosure, the second sub-network module 102 in the tag identification network 100 receives the intermediate sub-images output by the first sub-network module 101, and outputs the second sub-identification tag R2.

Figure 8:
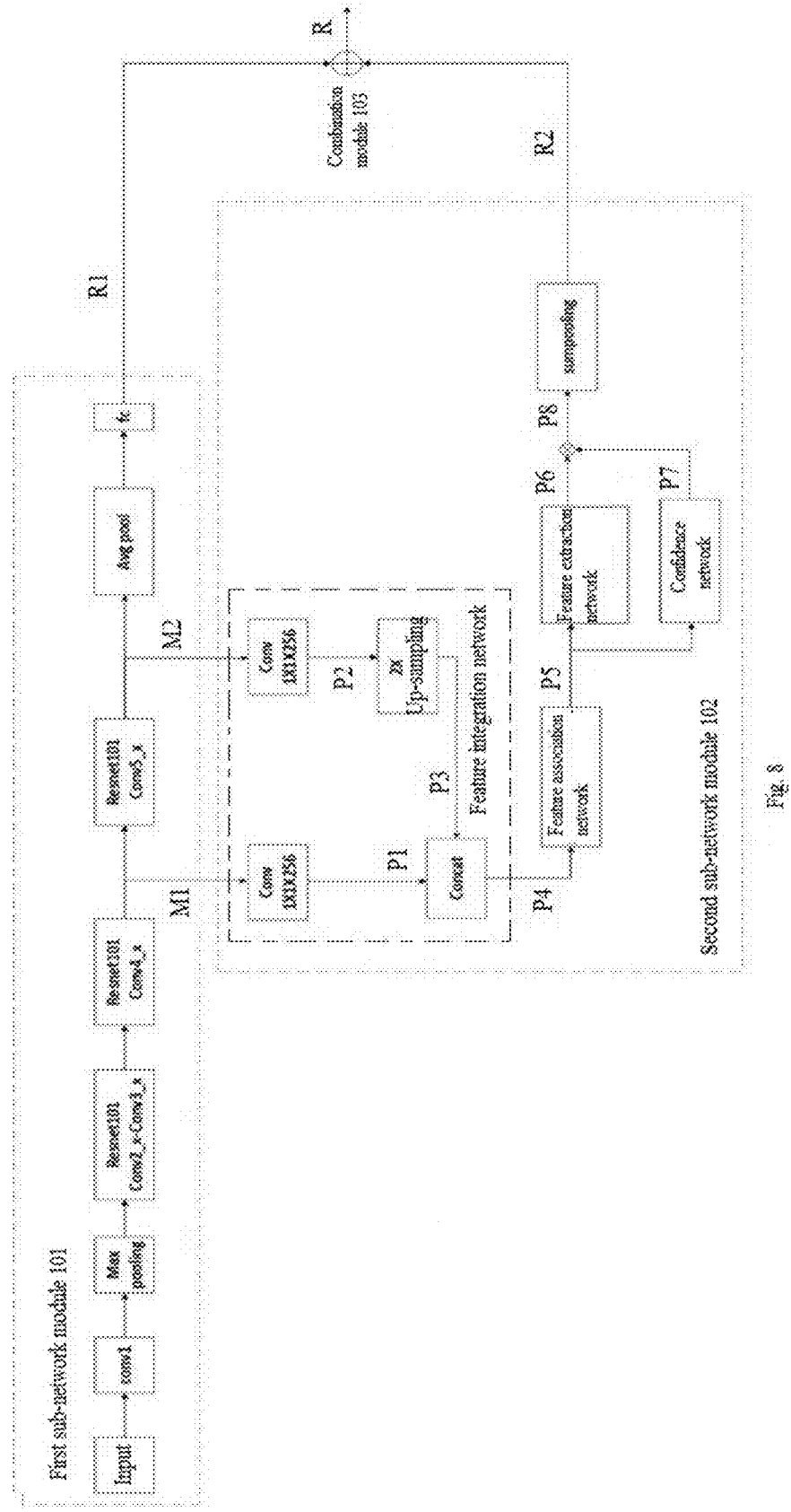
FIG. 8 shows a structure diagram of a tag identification network according to some embodiments of the present disclosure.

FIG. 8 shows a structure diagram of a tag identification network according to some embodiments of the present disclosure, of which the first sub-network module 101 adopts the structure of the convolution neutral network (RestNet-101) as described above, and thus no further details are given herein. The second sub-network module 102 receives the first intermediate sub-image M1 and the second intermediate sub-image M2 output by the first sub-network module 101. Herein, the first intermediate sub-image M1 can be an output result of an i-th convolution layer of the first sub-network module 101, for example, a convolution later Conv4_x, at this time, i=4. The second intermediate sub-image M2 can be an output result of a j-th convolution layer of the first sub-network module 101, for example, a convolution layer Conv5_x, at this time, j=5. Since compared with M1, M2 has gone through processing of convolution layers having a greater-numbered layers, for example, a convolution layer Conv5_x, so that the size of the feature map of M2 is smaller than the size of the feature map of M1. For example, the feature map of M1 is 14×14×1024, and then the feature map of M2 obtained after being processed by the convolution layer Conv5_x can be 7×7×2048. Herein 14×14 or 7×7 represents the size of the feature map, 1024 or 2048 represents the number of channels of the feature map, and the number of channels are the same as the number of convolution kernels in the convolution layer. For example, the second sub-image M2 obtained by being processed by more convolution layers can be represented as a high-layer feature, and the first sub-image M1 obtained by being processed by less convolution layers can be represented as a low-layer feature.

The first intermediate sub-image M1 as the low-layer feature comprises more texture information (or referred to as detail information) because it has a relatively large size of feature map, while the second mediate sub-image M2 as the high-layer feature comprise rich semantic information because it has a relatively small size of feature map and has gone through processing of a convolution network of a deeper layer. In other words, the high-layer feature extracts a more accurate image feature because it performs deeper analysis. The second sub-network module 102 receives intermediate sub-images having features of different layers and jointly performs image feature processing, and implements identification of content features by utilizing different sizes of feature maps. The process of integrating the high-layer feature and the low-layer feature can not only full utilize the semantic information in the high-layer feature but also fully utilize the detail information in the low-layer feature, so that it is more favorable to raise the accuracy of identification of content features.

As shown in FIG. 8, the second sub-network module 102 of the tag identification apparatus 100 may comprise structures such as feature integration network, feature association network, feature extraction network, confidence network, etc. Herein, the feature integration network is used to receive the intermediate sub-images M1 and M2 output by the first sub-network module 101.

According to the embodiments of the present disclosure, the feature integration network can process the intermediate sub-images M1 and M2 by utilizing the convolution network Cony respectively, and output processing results P1 and P2 respectively. For example, when the feature map of the first intermediate sub-image M1 is 14×14×1024 and the feature map of the second intermediate sub-image M2 is 7×7×2048, the sub-image M1 can generate the feature map P1 having 256 channels after being processed by one 256-kernel 1×1 convolution layer-s, and its size is 14×14×256; the sub-image—M2 can generate the feature map P2 having 256 channels after being processed by one 256-kernel 1×1 convolution layer and its size is 7×7×256. Then, a doubled up-sampling process is performed on the feature map, so that the output feature map P3 has a size of 14×14×256 being the same as the feature map P1. The feature integration network can further comprise a merge module (Concat). The merge module can be implemented for example by adopting a Concat function, and configured to combine two or more data arrays. For example, the feature maps P1 and P3 can be input together to the merge module, and the merge module merges the feature maps P1 and P3 and outputs a merged feature map P4 with a size of 14×14×512.

Figure 9:
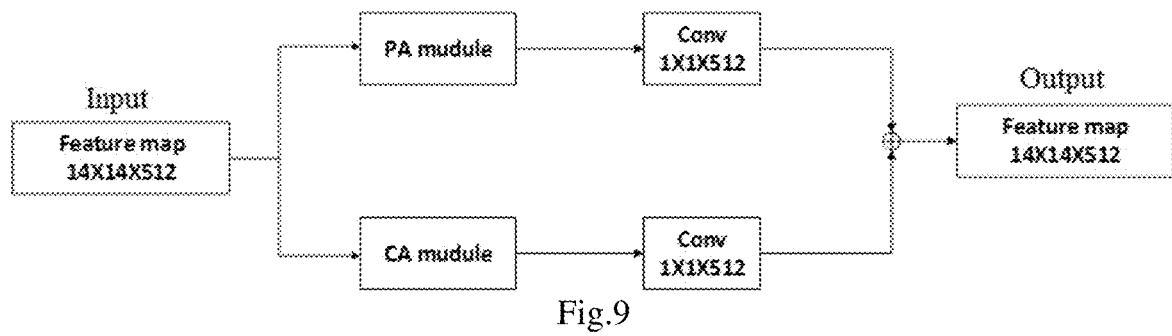
FIG. 9 shows a structure diagram of a feature association network according to some embodiments of the present disclosure.

According to the embodiments of the present disclosure, the feature integration network inputs the feature map P4 to the feature association network. FIG. 9 shows a structure diagram of the feature association network according to the embodiments of the present disclosure.

As shown in FIG. 9, the feature association network can be used to receive the feature map P4, the size of the feature map P4 can be 14×14×512, and the feature association network can further perform an association process on features in the received feature map P4, for the use of strengthening expression of the features. In other words, the feature association network can enable the neutral network to give more focus on features associated with an expected result, so as to realize a better effect of feature identification. According to some embodiments of the present disclosure, the feature association network can for example comprise a position attention (PA) module and a channel attention (CA) module in the prior art to process the input feature maps respectively, and can further comprise the convolution network Cony to further extract feature maps output by the position attention module or the channel attention module and generate feature maps P5' and P5" respectively, so as to further realize cross-channel interaction and information integration. The size of the feature maps P5' and P5" can be for example 14×14×512. The feature association network can perform an adding process on the feature maps P5' and P5", to obtain the feature map P5, and the size of P5 can be for example 14×14×512. The feature association network can output the feature map P5 to the feature extraction network and the confidence network. It needs to note that the feature association network may be provided with other processing structures in accordance with the requirement for image processing, to which the present disclosure does not make any limitation.

Figure 10:
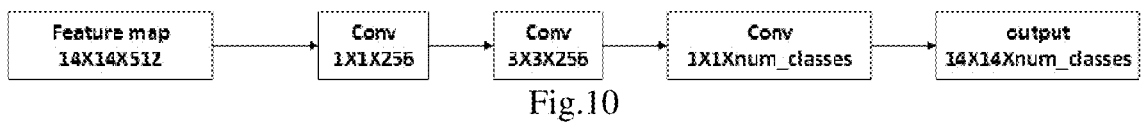
FIG. 10 shows a structure diagram of a feature extraction network according to some embodiments of the present disclosure.

FIG. 10 shows a structure diagram of the feature extraction network according to the embodiments of the present disclosure. The feature extraction network can be used to receive the feature map P5 output by the feature association network, and its size can be 14×14×512. According to some embodiments of the present disclosure, the feature extraction network may adopt the structure of attention network in the prior art. Attention of the neutral network can be understood for example as a selective visual attention mechanism of human beings, and its core objective is to select information more critical to a current processing task from numerous information. As shown in FIG. 10, the feature extraction network can be composed of a 256-channel 1×1 convolution layer, a 256-channel 3×3 convolution layer, and a num_classes-channel 1×1 convolution layer, where num_classes is the number of content features expected to be identified. For example, in a case where there are 10 content features expected to be identified, the content features can be cat, dog, human, window, sky, sun, mountain, river, house, and chair respectively. At this time, the value of num_classes can be set as 10, that is, the feature extraction network would output the feature map P6 with a size of 14×14×10.

Figure 11:
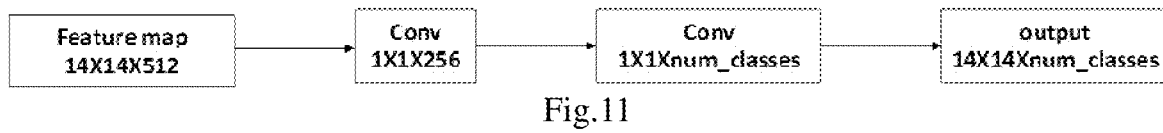
FIG. 11 shows a structure diagram of a confidence network according to some embodiments of the present disclosure.

FIG. 11 shows a structure diagram of a confidence network according to some embodiments of the present disclosure, which is used to generate a confidence value corresponding to the feature map extracted by the feature extracted network, i.e., being used to determine whether the input image includes content features expected to be identified. According to some embodiments of the present disclosure, the confidence network can comprise for example 256-channel 1×1 convolution layer, num_classes-channel 1×1 convolution layer, where num_classes is the number of content features expected to be identified, for example, num_classes=10. The confidence network finally outputs a feature map P7, and its size can be for example 14×14×10.

According to the embodiments of the present disclosure, the feature extraction network can be used to realize analysis on the image feature, for example, when the content features expected to be identified are 10 feature tags as described above, the feature extraction network focuses extraction of the image features, and matches a corresponding feature map with respect to each feature tag. The confidence network can be used to determine confidence of a result of matching each feature tag with the feature map corresponding thereto.

In the second sub-network module 102 as shown in FIG. 8, a multiplying process can be performed on corresponding elements in the results P6 and P7 output by two networks, to generate a final feature map P8. Then, the second sub-network module 102 can further comprise a sumpooling module, for example, it can be configured to give summation of pixel values of feature maps of each channel in the received feature map P8. In this way, the feature map of each channel is given a value, that is, the feature maps of num_classes channels would finally obtain a vector with a length of num_classes. This vector can be served as the second sub-identification tag R2 output by the second sub-network module 102.

Thus, two sub-identification tags, i.e., the tag vector R1 and the tag vector R2, are obtained by utilizing the first sub-network module 101 and the second sub-network module 102 respectively. According to the embodiments of the present disclosure, the tag identification module 100 can combine the sub-identification tags R1 and R2 by utilizing the combination module 103, to obtain the identification tag R. For example, the identification tag R can be expressed as R=0.5×(R1+R2). According to other embodiments of the present disclosure, R can be generated based on R1 and R2 by means of other methods. For example, R can be obtained by setting different weight values for R1 and R2. At this time, the identification tag R can be expressed as R=a×R1+b×R2, where a and b can be weight values of R1 and R2, The second sub-network module in the tag identification apparatus according to the present disclosure can receive feature maps that have different sizes and output by the first sub-network module, so as to merge the feature maps having different sizes, and thus fully utilize the semantic information included in the feature map having the high-layer feature and the detail information included in the feature map having the low-layer feature, so as to increase the accuracy for the tag identification apparatus to perform tag identification.

According to the embodiments of the present disclosure, the tag identification apparatus can further comprise a training module configured to acquire a first number of first images, each of the first images having its standard tag; adjust parameters of the tag identification network by utilizing the first number of first images and their standard tags; select a second number of the first images from the first number of first images as an image to be converted, the second number being smaller than the first number; for each image to be converted, perform a style conversion process to generate the second images corresponding thereto, and serve a standard tag of the image to be converted as a standard tag of the second image; and adjust the parameters of the tag identification network by utilizing the second number of the second images and their standard tags. According to the embodiments of the present disclosure, the standard tag can comprise a content tag or a scene tag.

According to the embodiments of the present disclosure, the training module is further configured to acquire a third number of third images, each of the third images having its standard tag; adjust the parameters of the tag identification network by utilizing the third number of third images and their standard tags, wherein styles of the second images and the third images are the same.

According to the embodiments of the present disclosure, adjusting, by the training module, the parameters of the tag identification network by utilizing the first number of first images and their standard tags comprises: as for a part of first images in the first number of first images, inputting each first image to the first sub-network module as a first training image, adjusting the parameters of the first sub-network module according to the standard tag of the training image and the first sub-identification tag output by the first sub-network module; and fixing the parameters of the first sub-network module, and utilizing each first image of at least a part of the first number of first images as a second training image to be input to the first sub-network module, and adjusting the parameters of the second sub-network module according to the standard tag of the second training image and the second sub-identification tag output by the second sub-network module.

According to the embodiments of the present disclosure, adjusting, by the training module, the parameters of the second sub-network module comprises: receiving the first intermediate sub-image and the second intermediate sub-image output by the first sub-network module, and processing the intermediate sub-image to generate a second sub-identification tag; and adjusting the parameters of the second sub-network module according to the standard tag of the input image and the second sub-identification tag output by the second sub-network module.

According to the embodiments of the present disclosure, the first image can be a photographic image, the second image can be a painting work generated by performing the style conversion process on the first image, and the third image can be a real painting work.

According to the embodiments of the present disclosure, the process that the training module trains the parameters of the tag identification network can refer to the process as shown in FIG. 1, and thus no further details are given herein.

Figure 12:
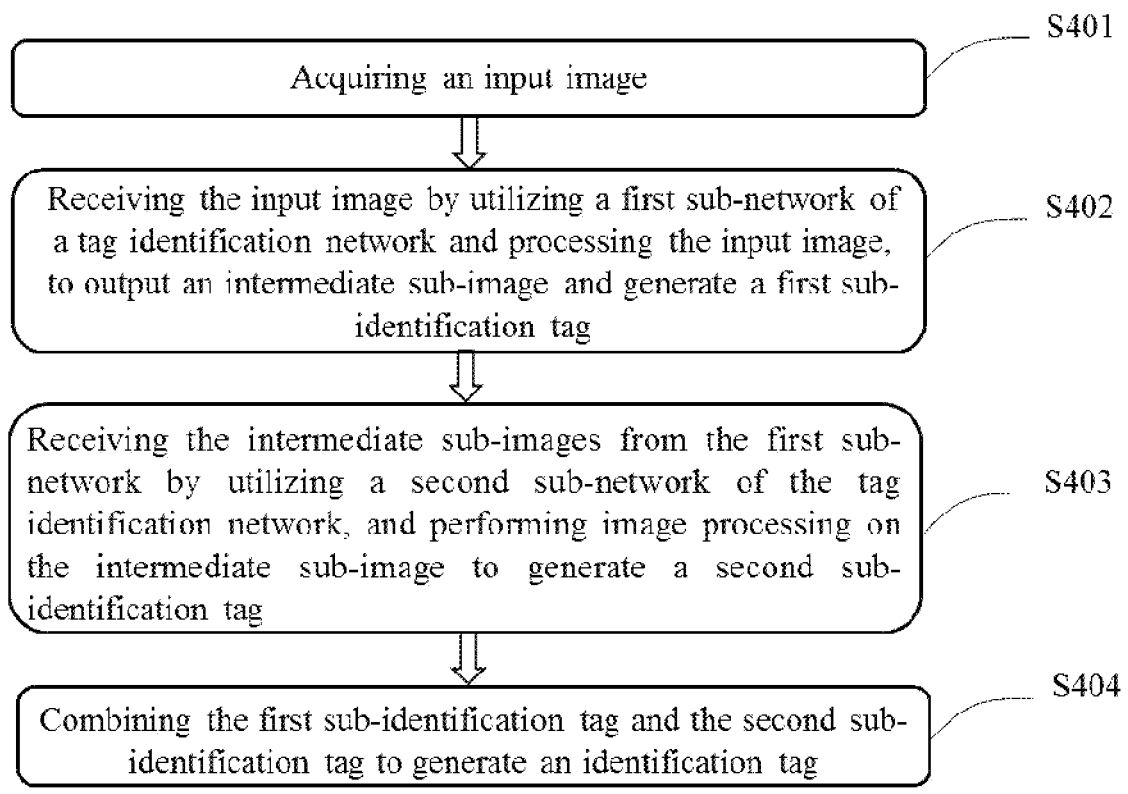
FIG. 12 shows a flow diagram of a tag identification method according to some embodiments of the present disclosure.

According to other embodiments of the present disclosure, there is further proposed a tag identification method. FIG. 12 shows a flow diagram of a tag identification method according to the embodiments of the present disclosure.

As shown in FIG. 12, in step S401, an input image is acquired, and the input image can be an image of a painting work whose content features are expected to be identified. Next, in step S402, the input image is received by utilizing the first sub-network of the tag identification network and then processed, and an intermediate sub-image is output and the first sub-identification tag R1 is generated. The tag identification network can be for example implemented as the network or the apparatus as shown in FIG. 3 or FIG. 8. Before tags are identified by utilizing the tag identification network, the tag identification network can be trained by combining with the image style conversion process based on a great number of photographic images by utilizing the training method as shown in FIG. 1, to adjust the parameters in the network, so that the tag identification network is capable of outputting an expected identification tag. The structure of the first sub-network can be as shown in FIG. 8.

Next, in step S403, the intermediate sub-image is received from the first sub-network by utilizing the second sub-network of the tag identification network, and the intermediate sub-image is processed to generate a second sub-identification tag R2. According to the embodiments of the present disclosure, the structure of the second sub-network can be as shown in FIG. 8.

Finally, in step S404, the tag identification network can combine the first sub-identification tag R1 and the second sub-identification tag R2, so as to generate a final identification tag R.

In the tag identification method according to the embodiments of the present disclosure, the first sub-network has a plurality of convolution layers, the output result of the i-th convolution layer is served as the first intermediate sub-image M1, the output result of the j-th convolution layer is served as the second intermediate sub-image M2, the first intermediate sub-image M1 and the second intermediate sub-mage M2 have different sizes, i is smaller than j, and i and j are positive integers; the identification tag R is generated based on the first sub-identification tag R1 and the second sub-identification tag R2 by utilizing the tag identification network.

For example, the identification tag R can be expressed as R=0.5×(R1+R2). According to other embodiments of the present disclosure, R can be generated based on R1 and R1 by means of other methods. For example, R can be obtained by setting different weight values for R1 and R2. At this time, the identification tag R can be expressed as R=a×R1+b×R2, where the a and b can be weight values of R1 and R2.

Additionally, the tag identification network can further output the first sub-identification tag R1, the second sub-identification tag R2 and the identification tag R. Herein, R, R1 and R2 may be tag vectors corresponding to a plurality of content features, or may be a tag value corresponding to one content feature.

In the embodiments of the present disclosure, in order to make it convenient for understanding and describing, descriptions of modules corresponding to the functions to be performed are used. It is easy to understand that these modules are functional entities, and do not always have to correspond to entities independent of each other physically or logically. The functions required can be performed through a general circuit or a specific circuit. For example, these functional entities are implemented by means of using a general processor (e.g., CPU, MCU) to run software of a corresponding function to execute an instruction of a computer, or these functional entities are implemented programmatically in one or more hardware modules or in an integrated circuit (e.g., DSP, FPGA), or these functional entities are implemented by designing as an integrated circuit (e.g., ASIC, TPU) especially for performing a corresponding function.

Figure 13:
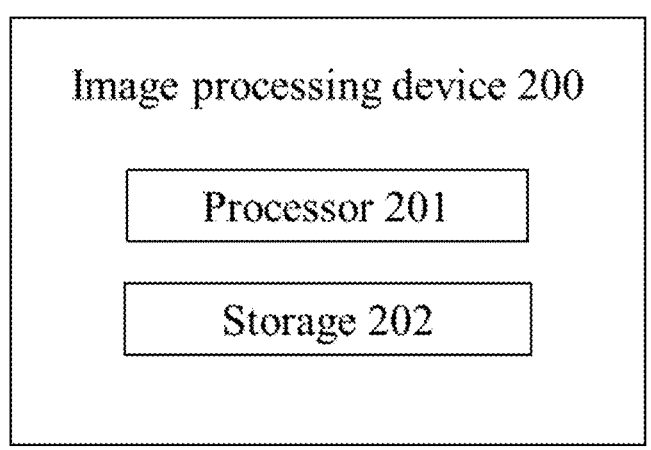
FIG. 13 shows a structure schematic diagram of an image processing device according to some embodiments of the present disclosure.

According to another aspect of the present disclosure, there is provided an image processing device. FIG. 13 shows a structure schematic diagram of an image processing device 200 according to some embodiments of the present disclosure.

As shown in FIG. 13, the image processing device 200 can comprise a processor 201 and storage 202. Herein, the storage 202 is stored with a computer readable code which performs the training method for the tag identification network as described above or performs the tag identification method as described above when being executed by the processors 201.

For example, the processor can be a logic operation device having data processing capability and/or program, execution capability such as a central processing unit (CPU), a field programmable gate array (FPGA), a single chip microcomputer (MCU), a digital signal processor (DSP), an application specific integrated circuit (ASIC), etc.

For example, the storage comprises but does not limit to for example a volatile memory and/or non-volatile memory. The volatile memory may comprise for example, a random access memory (RAM) and/or a cache memory, etc. The non-volatile memory can comprise for example a read-only memory, a hardware, a flash memory etc.

The present disclosure provides the training method for the tag identification network, the tag identification apparatus/method and the image processing device. The training method for the tag identification network implements the process of training the identification network by combining with the image style conversion process based on the easily obtained photographic images. The second image obtained by conversion has a standard tag the same as the first image that generates the second image, i.e., reducing the step of labeling the real tag for the second image, so that the process of training the tag identification network is simplified. Additionally, compared with a painting work, it becomes easier for the photographic image to obtain large amounts of training data for training neutral network, i.e., reducing the task in obtaining a great quantity of painting works and labeling their real tags. Thus, according to the training method of the present disclosure, the training process of the neutral network expected to perform tag identification on the images having features of the painting works by utilizing the easily obtained photographic images and the images of a few painting works.

Additionally, the second sub-network module in the tag identification apparatus according to the present disclosure can receive feature maps which have different sizes and are output by the first sub-network, so as to merge the feature maps having different sizes, to fully utilize the semantic information included in the feature map having high-layer features and the detail information included in the feature map having low-layer features, thereby providing accuracy for the tag identification apparatus to perform tag identification.

Unless otherwise defined, all terms (including technical and scientific terms) used herein have the meanings being the same as those meanings commonly understood by those ordinary skilled in the art. It shall be further understood that those terms such as defined in general dictionaries shall be explained as having meanings consistent with meanings in the context of related technology, but shall not be explained by idealized or highly-formalized meanings, unless otherwise explicitly defined.

The above are descriptions of the present disclosure, but shall not be considered as limitations to the present disclosure. Although several exemplary embodiments of the present disclosure are described, it is easy for those skilled in the art to understand that various amendments can be made to the exemplary embodiments without departing from novel teachings and advantages of the present disclosure. Therefore, all these amendments intend to be included within the scope of the present disclosure as defined in the Claims. It shall be understood that the above are the descriptions of the present disclosure, but shall not be considered as being limited to specific disclosed embodiments. Furthermore, amendments made to the embodiments and other embodiments of the present disclosure shall intend to be included within the scope of the Claims. The present disclosure is defined by the Claims and equivalents thereof.

The present application claims the priority of a Chinese patent application No. 201811353105.X filed on Nov. 14, 2018. Herein, the content disclosed by the Chinese patent application is incorporated in full by reference as a part of the present disclosure.

What is claimed is:

1. A training method for a tag identification network, comprising:
    acquiring a first number of first images, each of the first images having its standard tag;
    adjusting parameters of the tag identification network by utilizing the first number of first images and their standard tags;
    selecting a second number of first images from the first number of first images as images to be converted, the second number being smaller than the first number;
    performing a style conversion process on each of images to be converted to generate a second image corresponding thereto, and serving a standard tag of the image to be converted as a standard tag of the second image; and
    adjusting the parameters of the tag identification network by utilizing the second number of the second images and their standard tags.

2. The method according to claim 1, further comprising:
    acquiring a third number of third images, each of the third images having its standard tag;
    adjusting the parameters of the tag identification network by utilizing the third number of third images and their standard tags, wherein
    a style of the third images is the same as a style of the second images.

3. The method according to claim 2, wherein the first image is a photographic image, the second image is a painting work generated by performing a style conversion process on the first image, and the third image is a real painting work.

4. The method according to claim 1, wherein the tag identification network comprises a first sub-network and a second sub-network;
    the first sub-network receives an input image, outputs an intermediate sub-image to the second sub-network, and generates a first sub-identification tag of the input image, and
    the second sub-network receives the intermediate sub-image from the first sub-network, and generates a second sub-identification tag.

5. The method according to claim 4, wherein the adjusting parameters of the tag identification network by utilizing the first number of first images and their standard tag comprises:
    as for a part of first images in the first number of first images, inputting each of the first images to the first sub-network as the input image, adjusting parameters of the first sub-network according to a standard tag of the input image and a first sub-identification tag output by the first sub-network; and
    fixing the parameters of the first sub-network, utilizing each of at least a part of first images in the first number of first images as the input image to be input to the first sub-network, and adjusting parameters of the second sub-network according to the standard tag of the input image and the second sub-identification tag output by the second sub-network.

6. The method according to claim 5, wherein the first sub-network has a plurality of convolution layers, and adjusting parameters of the second sub-network comprises: as for each of the first images,
- serving an output result of an i-th convolution layer in the first sub-network as a first intermediate sub-image to be input to the second sub-network;
- serving an output result of a j-th convolution layer in the first sub-network as a second intermediate sub-image to be input to the second sub-network, the second intermediate sub-image and the first intermediate sub-image having different sizes;
- adjusting the parameters of the second sub-network according to the standard tag of the first image and the second sub-identification tag output by the second sub-network, where i is smaller than j, and i and j are positive integers.

7. The method according to claim 1, wherein the standard tag comprises a content tag or a scene tag.

8. A tag identification apparatus, comprising:
- a first sub-network module, configured to receive an input image, process the input image to generate intermediate sub-images, and generate a first sub-identification tag of the input image;
- a second sub-network module, configured to receive the intermediate sub-images from the first sub-network module, and process the intermediate sub-image to generate a second sub-identification tag;
- a combination module, configured to combine the first sub-identification tag and the second sub-identification tag, and generate an identification tag; and
- a training module, configured to:
- acquire a first number of first images each of the first images having its standard tag;
- adjust parameters of the tag identification network by utilizing the first number of first images and their standard tags;
- select a second number of first images from the first number of first images as images to be converted, the second number being smaller than the first number;
- perform a style conversion process on each of images to be converted to generate a second image corresponding thereto, and serve a standard tag of the image to be converted as a standard tag of the second image; and
- adjust parameters of the tag identification network by utilizing the second number of the second images and their standard tags.

9. The tag identification apparatus according to claim 8, wherein the first sub-network module has a plurality of convolution layers, and an output result of an i-th convolution layer is served as a first intermediate sub-image to be input to the second sub-network module, an output result of a j-th convolution layer is served as a second intermediate sub-image to be input to the second sub-network module, and the second intermediate sub-image and the first intermediate sub-image have different sizes;

where i is smaller than j, and i and j are positive integers.

10. The tag identification apparatus according to claim 8, wherein the training module is further configured to acquire a third number of third images, each of the third images having its standard tag;
- adjust the parameters of the tag identification network by utilizing the third number of third images and their standard tags, wherein a style of the third images is the same as a style of the second images.

11. The tag identification apparatus according to claim 8, wherein adjusting, by the training module, parameters of the tag identification network by utilizing the first number of first images and their standard tag comprises:
- as for a part of first images in the first number of first images, inputting each of the first images to the first sub-network module as a first training image, and adjusting parameters of the first sub-network module according to a standard tag of the first training image and a first sub-identification tag output by the first sub-network module; and
- fixing the parameters of the first sub-network module, utilizing each of at least a part of first images in the first number of first images as a second training image to be input to the first sub-network module, and adjusting parameters of the second sub-network module according to a standard tag of the second training image and the second sub-identification tag output by the second sub-network module.

12. The tag identification apparatus according to claim 11, wherein adjusting, by the training module, the parameters of the second sub-network module comprises:
- receiving a first intermediate sub-image and a second intermediate sub-image output by the first sub-network module, and processing the intermediate sub-image to generate a second sub-identification tag;
- adjusting the parameters of the second sub-network module according to the standard tag of the input image and the second sub-identification tag output by the second sub-network module.

13. The tag identification apparatus according to claim 10, wherein the first image is a photographic image, the second image is a painting work generated by performing a style conversion process on the first image, and the third image is a real painting work.

14. The tag identification apparatus according to claim 8, wherein the standard tag comprises a content tag or a scene tag.

15. A tag identification method, comprising:
- acquiring an input image;
- receiving the input image by utilizing a first sub-network of a tag identification network and processing the input image, to output an intermediate sub-image and generate a first sub-identification tag;
- receiving the intermediate sub-image from the first sub-network by utilizing a second sub-network of the tag identification network, and performing image processing on the intermediate sub-image to generate a second sub-identification tag; and
- combining the first sub-identification tag and the second sub-identification tag to generate an identification tag, wherein parameters of the tag identification network is adjusted by a training method, the training method comprises:
- acquiring a first number of first images, each of the first images having its standard tag;
- adjusting the parameters of the tag identification network by utilizing the first number of first images and their standard tags;
- selecting a second number of first images from the first number of first images as images to be converted, the second number being smaller than the first number;
- performing a style conversion process on each of images to be converted to generate a second image corresponding thereto, and serving a standard tag of the image to be converted as a standard tag of the second image; and adjusting the parameters of the tag identification network by utilizing the second number of the second images and their standard tags.

16. The tag identification method according to claim 15, wherein the first network has a plurality of convolution layers, an output result of an i-th convolution layer is served as a first intermediate sub-image, an output result of a j-th convolution layer is served as a second intermediate sub-image, and the first intermediate sub-image and the second intermediate sub-image have different sizes, where i is smaller than j, and i and j are positive integers;

an identification tag is generated based on the first sub-identification tag and the second sub-identification tag by utilizing the tag identification network.

17. An image processing device, comprising:

a processor;

a non-volatile memory, wherein the non-volatile memory is stored with a computer readable code which performs, when executed by the processor, the training method for a tag identification network according to claim 1.

* * * * *